Jan. 18, 1955  W. C. MANGIS  2,699,950
BORING TOOLHOLDER
Filed March 13, 1953

Warner C. Mangis, INVENTOR.

United States Patent Office 2,699,950
Patented Jan. 18, 1955

2,699,950

BORING TOOLHOLDER

Warner C. Mangis, Evansville, Ind.

Application March 13, 1953, Serial No. 342,243

4 Claims. (Cl. 279—6)

My invention relates to improvements in boring tool holders for use in a lathe chuck, or the like.

The primary object of my invention is to provide an efficient boring or cutting tool holder for revolving by a lathe chuck and providing for a wide range of precision settings of a boring or cutting tool to cut holes of different diameters in a piece of work.

Another object is to provide a tool holder of the character and for the purpose above set forth which is inexpensive to manufacture and not liable to get out of order.

Other and subordinate objects, within the purview of my invention, together with the precise nature of my improvements will be readily understood when the succeeding description and claims are read with reference to the drawing accompanying and forming part of this specification.

Figure 1:
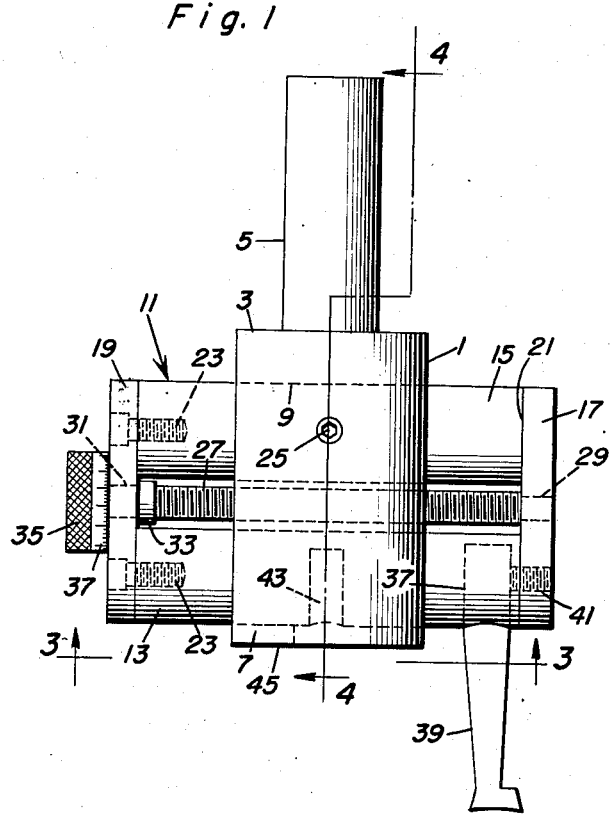
Figure 1 is a view in side elevation of my improved boring tool holder, in the preferred embodiment thereof.
Figure 2:
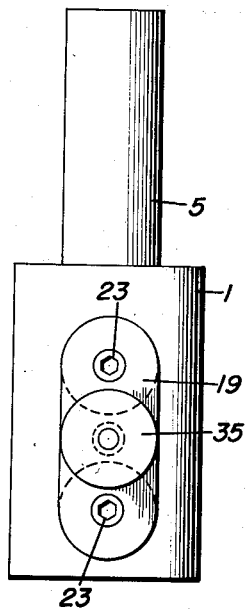
Figure 2 is a view in elevation with the tool holder turned at an angle of 90°.
Figure 3:
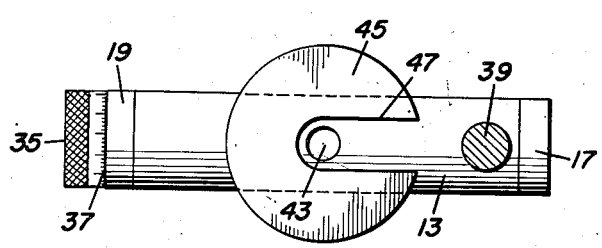
Figure 3 is a view in section partly in front elevation taken on the line 3—3 of Figure 1.
Figure 4:
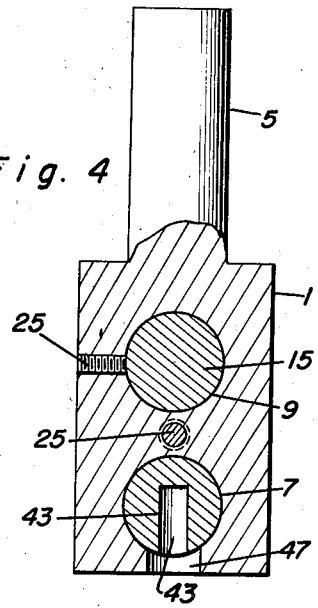
Figure 4 is a view in section taken on the line 4—4 of Figure 1.

Referring to the drawing by numerals, the tool holder of my invention comprises a cylindrical head 1 having a rear end 3 provided with an axial shank 5 for insertion in a lathe chuck, or the like, not shown. The head 1 is provided with a pair of diametrical parallel, like bores 7, 9 spaced longitudinally of said head and constituting front and rear bores.

A tool carrier 11 is mounted in the head 1 for sliding adjustment diametrically thereof. The tool carrier 11 comprises a pair of cylindrical front and rear, parallel and laterally spaced rods 13, 15 slidably extended through the bores 7, 9, respectively, for longitudinal adjustment therein. Oblong, flat end bars 17, 19 of said carrier connect the ends of the rods 13, 15 upon opposite sides of the head 1, one of said bars 17 being welded to the rods 13, 15, as at 21. The other bar 19 is secured to the ends of the rods 13, 15 by bolts 23 so that it can be attached after said rods are inserted through said bores. A setscrew 25 in the head 1 is provided for engagement with the rear rod 15 to lock said carrier in adjusted position.

A screw bolt 27 is threaded through the head 1 diametrically thereof between and parallel with the rods 13, 15 with a reduced end 29 rotatable in the end bar 17 at one end of the carrier 11, and its other end rotatably extended through the other end bar 19, as at 31, and provided at the other end of the carrier 11 with an end thrust collar 33 and a knurled operating knob 35 thereon on opposite sides of the bar 19 preventing end play of said bolt 27 in said carrier 11 so that turning of said bolt 27 will provide for screw feed adjustment of the carrier 11. The knob 35 is provided with the usual micrometer scale graduations 37 thereon for registration with an index mark, not shown, on the bar 19, for precision micromatic adjustment of the carrier 11. As will be seen, the screw bolt 27 and knob 35 are detachable with the end bar 19.

Adjacent the end of the carrier 11 opposite the end at which the knob 35 is located, the front rod 13 is provided with a front diametrical socket 47 therein for slip fit of a cutting tool 39 therein to extend forwardly of the carrier 11 and be locked therein by a setscrew 41 extending through the bar 17 into said rod 13. A second, smaller socket 43 is similarly provided in the rod 13 for threading therein of a smaller cutting tool, not shown, to be used optionally in lieu of the cutting tool 39. The front end 45 of the head 1 is radially slotted, as at 47 parallel with the front bar 13 for accommodating the mentioned tools therein to increase the range of adjustment of said carrier 11 and tools, and for retraction of the optional tool into the diametrical center of the head 1 if desired.

The use and operation of the invention will be readily understood. The cutting tools are adjusted radially of the head 1 to vary the size of the hole to be cut and by screw feed adjustment of the tool carrier 11 endwise diametrically of the head 1 into different set positions effected by turning of the knob 35 and the bolt 27. The tool carrier 11, and hence the tool, or tools, are locked in adjusted position by means of the setscrew 25. The range of adjustment of the cutting tool may be increased by substituting a tool carrier having longer rods 13, 15. Substantially all parts of my improved tool holder may be formed on a lathe, thus obviating expensive milling machine operations and dovetail grooving, so that the tool holder may be very inexpensively constructed.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

What is claimed as new is as follows:

1. A boring tool holder comprising a head provided with a shank adapted for insertion in a lathe chuck, a tool carrier comprising a pair of parallel spaced rods extended through said head and having ends connected at opposite sides of the head, said rods being slidable in said head for adjustment of said carrier, means for attaching a cutting tool to one of said rods for adjustment by said carrier, and screw feed means for sliding said rods.

2. A boring tool holder comprising a cylindrical head having an axial shank on one end thereof adapted to be inserted in a lathe chuck, a tool carrier comprising a pair of parallel spaced rods extended diametrically through said head, means connecting said rods together at opposite sides of the head, said rods being slidable in said head for adjustment of the carrier diametrically of said head, means on said carrier for attaching a cutting tool to one of said rods for adjustment radially of said head by adjustment of the carrier, and screw feed means for sliding said rods.

3. A boring tool according to claim 2, said second named means including sockets spaced along said rod for attaching a tool in different positions on said rod.

4. A boring tool holder according to claim 2, said last named means comprising a screw bolt threaded diametrically through said head and operatively connected to said first named means.

References Cited in the file of this patent

UNITED STATES PATENTS

| Number | Name | Date |
|---|---|---|
| 172,682 | Yule | Jan. 25, 1876 |
| 331,046 | Fitzgerald | Nov. 24, 1885 |
| 892,894 | Roman | July 7, 1908 |
| 1,028,805 | Wood | June 4, 1912 |
| 1,960,124 | Russell | May 22, 1934 |